United States Patent
Ishibashi

(10) Patent No.: US 7,119,917 B2
(45) Date of Patent: Oct. 10, 2006

(54) FACSIMILE SERVER DEVICE

(75) Inventor: Masakazu Ishibashi, Nagaokakyo (JP)

(73) Assignee: Murata Kikai Kabushiki Kaisha, Kyoto (JP)

( * ) Notice: Subject to any disclaimer, the term of this patent is extended or adjusted under 35 U.S.C. 154(b) by 0 days.

(21) Appl. No.: 10/222,351

(22) Filed: Aug. 15, 2002

(65) Prior Publication Data

US 2002/0191228 A1 Dec. 19, 2002

Related U.S. Application Data

(63) Continuation of application No. 09/256,849, filed on Feb. 24, 1999, now abandoned.

(30) Foreign Application Priority Data

Feb. 26, 1998 (JP) .................................. 10-90543

(51) Int. Cl.
*G06F 15/00* (2006.01)
*H04N 15/00* (2006.01)
*H04N 1/00* (2006.01)

(52) U.S. Cl. ...................... 358/1.15; 358/442; 358/405

(58) Field of Classification Search ................ 358/407, 358/1.15, 442, 444, 434, 440, 435, 400, 405, 358/468; 379/100.01
See application file for complete search history.

(56) References Cited

U.S. PATENT DOCUMENTS

| 5,206,743 | A | | 4/1993 | Hochman et al. |
| 5,226,074 | A | | 7/1993 | Han |
| 5,239,386 | A | | 8/1993 | Ishiwatari et al. |
| 5,268,904 | A | * | 12/1993 | Umeda .................. 370/251 |
| 5,291,302 | A | | 3/1994 | Gordon et al. |
| 5,477,353 | A | * | 12/1995 | Yamasaki .............. 358/487 |
| 5,502,486 | A | * | 3/1996 | Ueda et al. ............. 348/239 |
| 5,509,000 | A | * | 4/1996 | Oberlander ............. 370/409 |
| 5,530,907 | A | * | 6/1996 | Pavey et al. ............. 710/69 |
| 5,544,333 | A | * | 8/1996 | Frazier et al. ........... 710/124 |
| 5,636,034 | A | * | 6/1997 | Ishikawa ................. 358/434 |
| 5,644,625 | A | | 7/1997 | Solot |
| 5,666,215 | A | * | 9/1997 | Fredlund et al. ........ 358/487 |
| 5,666,578 | A | * | 9/1997 | Oikawa et al. .......... 396/319 |
| 5,696,576 | A | * | 12/1997 | Itoh et al. ............... 355/40 |
| 5,798,738 | A | * | 8/1998 | Yamada ................. 345/2.3 |
| 5,799,219 | A | * | 8/1998 | Moghadam et al. .... 396/319 |
| 5,838,457 | A | * | 11/1998 | Umemoto ............... 358/302 |
| 5,872,641 | A | | 2/1999 | Ozeki et al. |
| 5,875,302 | A | * | 2/1999 | Obhan ................... 709/225 |

(Continued)

FOREIGN PATENT DOCUMENTS

JP 04-003571 1/1992

(Continued)

*Primary Examiner*—Madeleine Nguyen
(74) *Attorney, Agent, or Firm*—Hogan & Hartson LLP

(57) ABSTRACT

A facsimile server device that can append TTI information to facsimile data in various manners. The facsimile server device is connected to a plurality of data processing devices such as client PCs over LAN, and is adapted to send facsimile data to a designated remote communication device upon instructions from a data processing device. The facsimile server device includes CPU, a keyboard or mouse and a display to set TTI information. TTI information may contain information about recipient, sender, time and page. The facsimile server device stores the TTI in RAM. TTI information in a certain form may also be provided from a data processing device. The TTI information programmed in the facsimile server device or the TTI information sent from the data processing device is given priority and appended to the facsimile data.

12 Claims, 5 Drawing Sheets

U.S. PATENT DOCUMENTS

| | | | | |
|---|---|---|---|---|
| 5,966,553 | A * | 10/1999 | Nishitani et al. | 396/303 |
| 5,974,232 | A * | 10/1999 | Kamiya | 709/238 |
| 5,978,016 | A * | 11/1999 | Lourette et al. | 348/64 |
| 5,995,238 | A * | 11/1999 | Yu | 358/404 |
| 5,995,240 | A | 11/1999 | Sato | |
| 6,028,680 | A * | 2/2000 | Seo | 358/440 |
| 6,104,499 | A * | 8/2000 | Yamada | 358/1.15 |
| 6,111,661 | A * | 8/2000 | Kim | 358/434 |
| 6,188,766 | B1 * | 2/2001 | Kocher | 380/246 |
| 6,212,550 | B1 * | 4/2001 | Segur | 709/206 |
| 6,282,577 | B1 * | 8/2001 | Okanoue et al. | 709/250 |
| 6,310,699 | B1 * | 10/2001 | Kawasaki | 358/434 |

FOREIGN PATENT DOCUMENTS

| | | |
|---|---|---|
| JP | 05-048780 | 2/1993 |
| JP | 05-114965 | 5/1993 |
| JP | 05-122417 | 5/1993 |
| JP | 07-023161 | 1/1995 |

* cited by examiner

FACSIMILE SERVER DEVICE

This is a continuation of application Ser. No. 09/256,849 filed Feb. 24, 1999, now abandoned which application is hereby incorporated by reference in its entirety.

BACKGROUND OF THE INVENTION

1. Field of the Invention

The present invention relates to a facsimile server device connected to a plurality of data processing devices via a LAN (Local Area Networks) or the like.

2. Description of the Related Art

As communications and computer technology have developed, various forms of communication networks have been proposed. For example, there is known a communication network which integrates a client-server system connecting a plurality of clients and servers to a LAN with PSTN (Public Subscriber Telephone Network) and/or ISDN (Integrated Service Digital Network) and transmits information. In such a client-server system, the client may use a data processing device like a personal computer (PC) and the server may use a facsimile server device in order to perform facsimile communication from the data processing device of the client via the facsimile server device.

In the client-server system, facsimile data is generated at each of the data processing devices, and sent to the facsimile server device. The facsimile server device transmits the facsimile data to remote facsimile and facsimile server devices via PSTN or ISDN networks based on instructions from the data processing devices. Further, the facsimile server devices notifies the data processing devices when facsimile data is received from the remote facsimile and facsimile server devices via the PSTN or ISDN lines.

Since facsimile data is comprised of image data that may include both text and pictures, the quantity of data that must be stored can become very large, and thus a memory device with large storage capacity is required to store large facsimile data. For this reason, the facsimile server devices are provided with large-capacity storage devices like hard disk drives.

Incidentally, by appending TTI information ("Transmittal Terminal Identifier information") including the addressee's name, the sender's name, the time of transmission, and the number of pages to be transmitted to the facsimile data, data management such as storage and confirmation of the transmitted facsimile data can be improved. For this reason, conventional stand-alone facsimile machines append TTI information to facsimile data when performing data transmission. These conventional facsimile devices connect one-to-one with remote facsimile devices during facsimile transmission via a PSTN telephone line or other communication network or line. Consequently, the transmitter and recipient are specified at the time facsimile data is transmitted, and therefore, appending TTI information to facsimile data is relatively easy.

When facsimile transmission is performed from a facsimile server device, however, some problems arise. The facsimile server device can be thought of as the "transmitting terminal", but since in fact the facsimile server device transmits facsimile data from a plurality of data processing devices, the data processing devices can also be considered the "transmitting terminals". One of these devices can be permanently designated the "transmitting terminal", but from the perspectives of the data processing device user and the LAN manager, such a solution is still problematic.

Japanese Patent Application, Laid-Open Publication No. 3-162034 published Jul. 12, 1991 discloses a facsimile communication system including a facsimile server and a plurality of facsimile terminals connected to the facsimile server. Identification information about each of the facsimile terminal devices and the facsimile server is appended to facsimile data and transmitted to a designated remote device. Therefore, the remote device can identify the origin of the facsimile data, i.e., from which facsimile terminal and facsimile server the data is sent.

SUMMARY OF THE INVENTION

It is an object of the present invention to provide a facsimile server device which appends various forms of TTI information to facsimile data when facsimile transmission is performed by the facsimile server device.

According to one aspect of the present invention, there is provided a facsimile server device which is connected to a plurality of data processing devices and which appends TTI information to facsimile data based on instructions from the data processing devices, characterized in that when TTI information data is already registered in the facsimile server device, the registered TTI information is appended to the facsimile data, and when TTI information data is not registered, TTI information is created and appended to the facsimile data based upon data transmission commands/instructions or information related thereto sent from a data processing device. If the above facsimile server device is employed, the registered TTI information is given priority when TTI information should be appended to the facsimile data.

TTI information may include transmission time information. If the TTI information includes the actual transmission time of the facsimile data, data management of the facsimile transmission can be performed accurately.

According to a second aspect of the present invention, a facsimile server device which is connected to a plurality of data processing devices and which appends TTI information to facsimile data based on instructions from the data processing devices, characterized in that when TTI information data is received from a data processing device, this TTI information is appended to the facsimile data, and when TTI information data is not received, TTI information registered in the facsimile server device is appended to the facsimile data. The TTI information data provided from the data processing device is given priority when TTI information should be appended to facsimile data.

TTI information may include transmission time information. If the TTI information includes the actual transmission time of the facsimile data, data management of the facsimile transmission can be performed accurately.

DETAILED DESCRIPTION OF THE INVENTION

Figure 5:
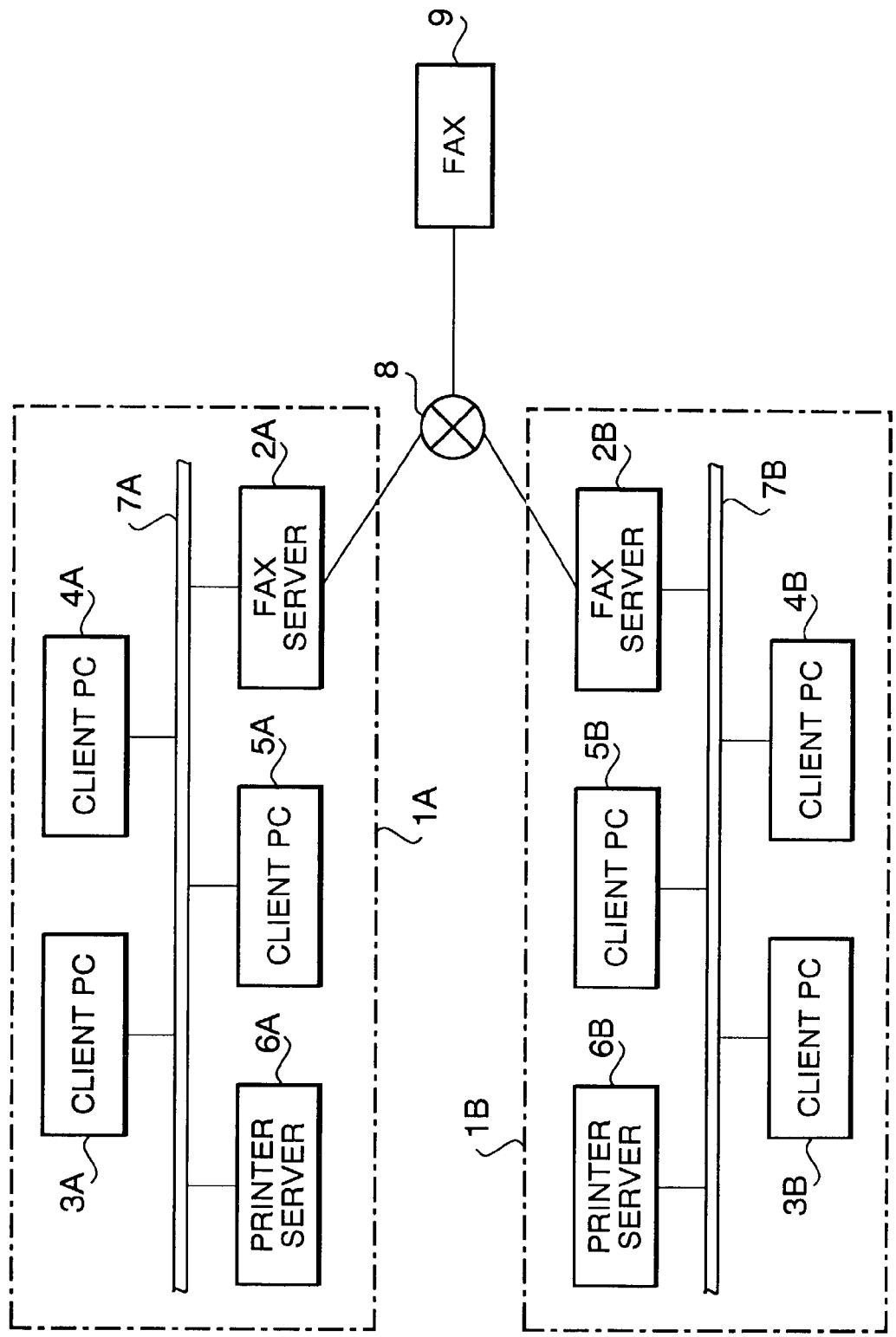
FIG. 5 illustrates an outline diagram of the arrangement of a system in which the facsimile server device of the present invention is employed.

An embodiment of the facsimile server device of the present invention is now described in reference to the accompanying drawings. Referring first to FIG. 5, illustrated is a system in which the facsimile server device of the present invention is employed. In FIG. 5, reference symbols 1A and 1B are client-server systems in which a plurality of clients and servers are connected over user LANs 7A and 7B. In the client-server system 1A, a facsimile server device 2A (indicated as Fax Server in the diagram), client PCs 3A, 4A, and 5A, and printer server 6A are connected to LAN 7A.

Similarly, in the client-server system 1B, a facsimile server device 2B, client PCs 3B, 4B and 5B, and printer server 6B are connected to LAN 7B. These client-server systems 1A, 1B may be arranged in, for example, a factory, an office, a store, or the like.

A facsimile device 9 is a stand-alone conventional facsimile machine. The client-server systems 1A, 1B and facsimile device 9 are connected over a line or network 8, which may be either PSTN or ISDN. In the system shown in FIG. 5, the fax server devices 2A and 2B and facsimile device 9 which are connected over the PSTN or ISDN 8, carry out facsimile communication with each other over the communication network.

Figure 1:
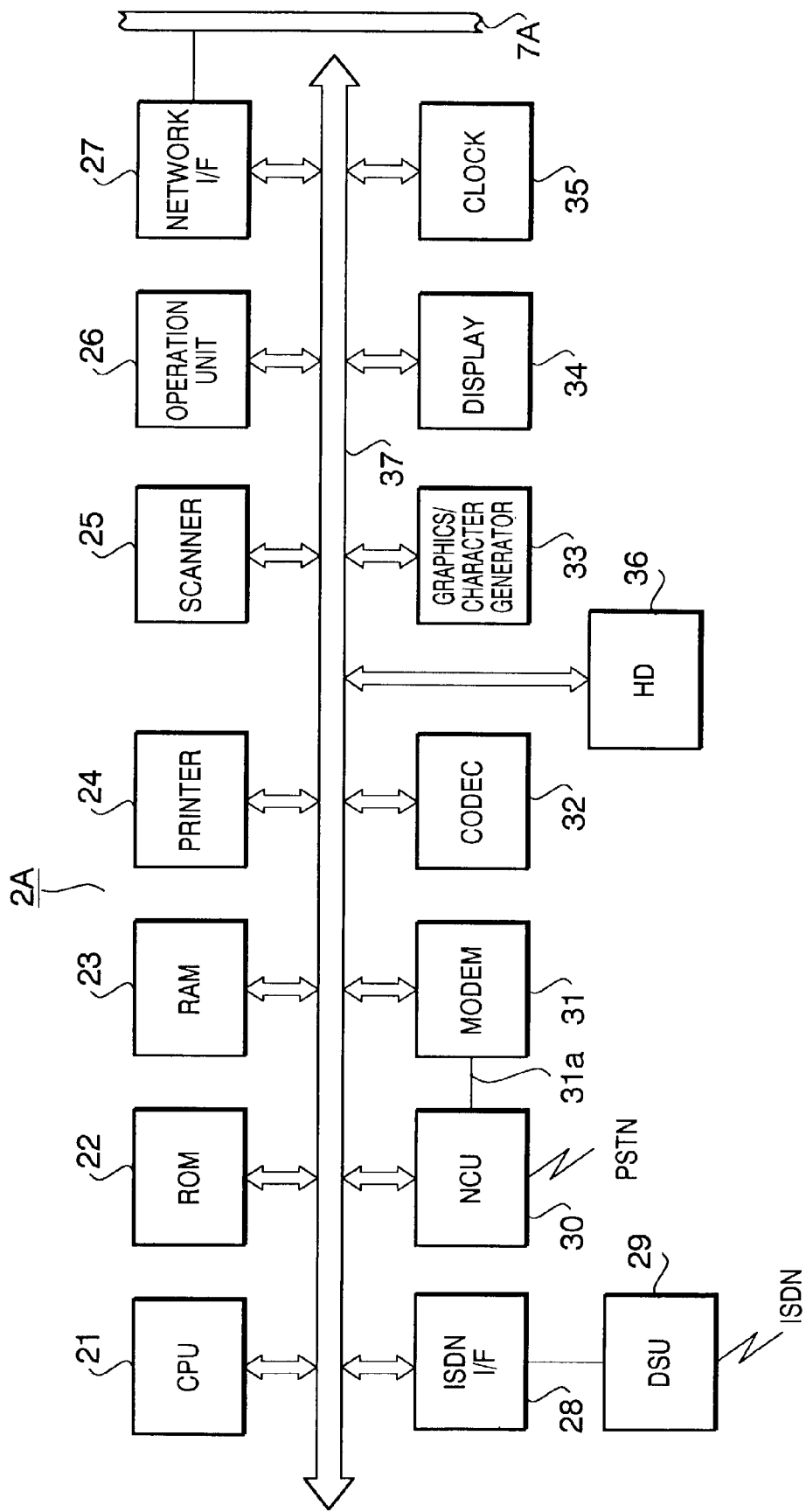
FIG. 1 illustrates a block diagram showing an embodiment of the facsimile server device of the present invention.

Referring to FIG. 1, illustrated is a block diagram of the facsimile server device 2A shown in FIG. 5. In FIG. 1, reference numeral 21 designates a CPU for processing various kinds of signals and data, 22 ROM for storing data and programs essential for the various operations of the facsimile server device 2A, and 23 RAM for storing administrative data and the like.

A printer 24 outputs received facsimile data onto recording sheets, and a scanning unit 25 scans a document and outputs binary image data which is facsimile data. An operating unit or control panel 26 is comprised of a keyboard, mouse, or the like. The facsimile server device 2A is connected to LAN 7A via a network interface 27.

The fax server device 2A connects to the ISDN over an ISDN interface 28 and DSU (Digital Service Unit) 29. It also connects to the PSTN line over NCU (Network Control Unit) 30. A modem 31 modulates and demodulates facsimile data sent to and received from a remote facsimile device over the PSTN line. The modem 31 and NCU 30 are connected over an analog signal line 31a.

CODEC 32 encodes facsimile data for transmission and decodes facsimile data that has been received. A graphics and character generating unit 33 converts character code information into image data. A display unit 34 employs a CRT (Cathode Ray Tube) and/or LCD (Liquid Crystal Display). A clock 35 is used to append the date and time to facsimile data, and a hard drive 36 stores facsimile data. Reference numeral 37 designates an internal BUS.

When the fax server device 2A transmits facsimile data specified by the client PCs 3A, 4A, 5A to a remote device over the PSTN/ISDN line 8, it appends TTI information to the facsimile data. In the present embodiment, the TTI information data registered in the fax server device 2A or received from the client PCs is given precedence and becomes the TTI information appended to the facsimile data.

Figure 2:
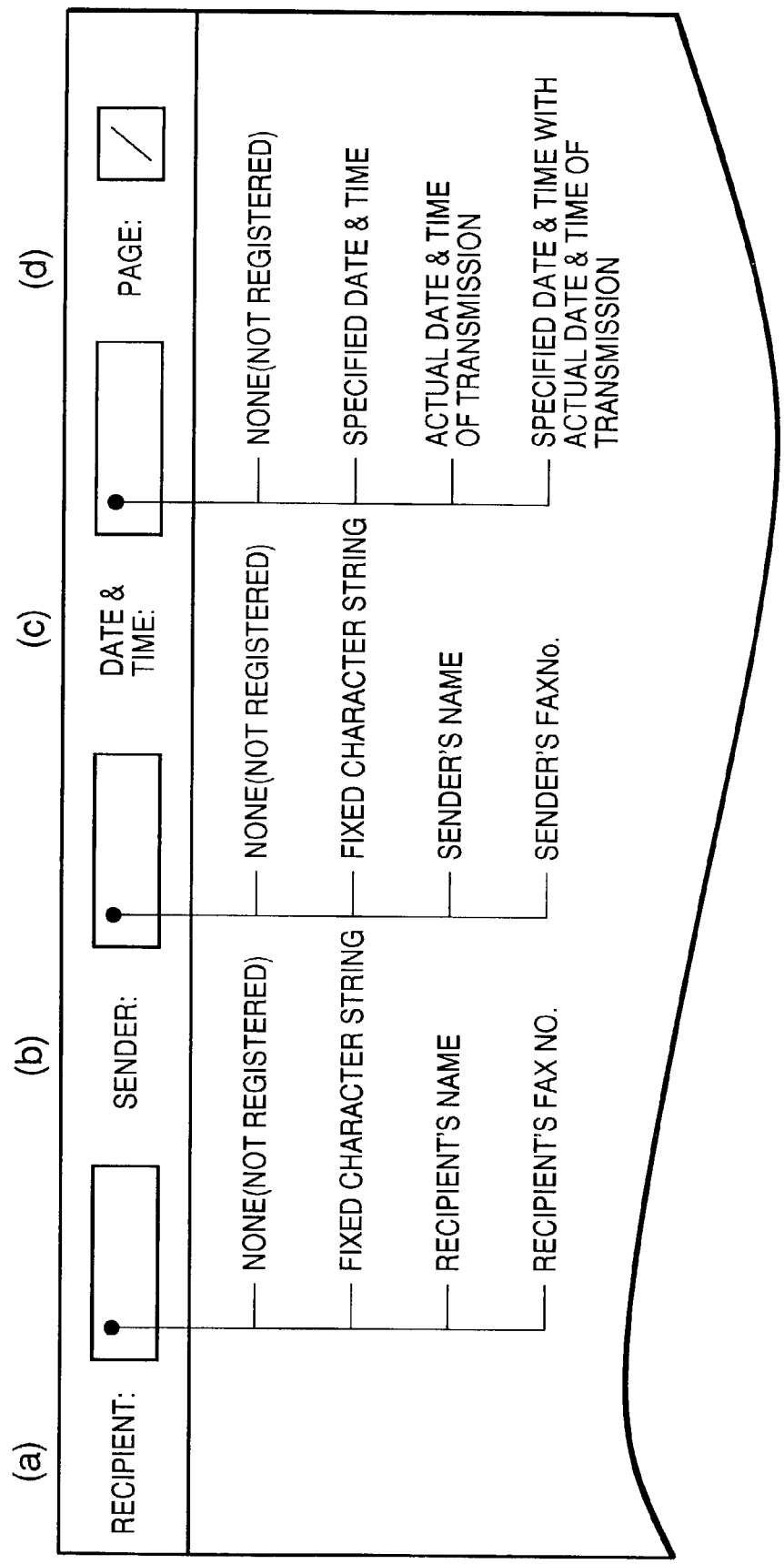
FIG. 2 illustrates an explanatory diagram of a display screen showing an example of the TTI information.

Referring to FIG. 2, illustrated is an explanatory diagram of a display screen showing an example of TTI information data registered in the fax server device 2A. In the example shown in FIG. 2, the addressee (a), the sender (b) the date and time (c) and page (d) are designated for the TTI information.

"None (Not Registered)", "Fixed Character String", "Addressee's Name", or "Addressee Fax Number" can be selected with a mouse or cursor for use in the addressee field (a). Similarly "None (Not Registered)", "Fixed Character String", "Sender's User Name", or "Sender's Fax Number" can be selected for the sender field (b). For the date and time field (c), "None (Not registered", "specified date and time", "dialed date and time", or "specified date and time and dialed date and time" can be selected. By including in TTI the field of date and time of actual data transmission ("dialed date and time"), management of facsimile data can be made accurate.

Each of the TTI information fields shown in FIG. 2 is set by a user with a keyboard or mouse of the operating unit 26 or the CRT of the display unit 34 which is connected to the CPU 21 via the internal BUS 37. The registered TTI information data is then stored in RAM 23.

The case where priority is given to the TTI information data registered in the fax server device 2A will now be described. When the fax server device 2A is instructed to transmit facsimile data from the client PC 3A, 4A or 5A, it also receives at least facsimile data and information about the transmission recipient. If TTI information data has been registered in the fax server 2A, the facsimile data is appended with the registered TTI information, and the facsimile data is sent to the designated recipient. However, if the TTI information data is not registered in the fax server 2A, TTI information is created and appended to the facsimile data based on the recipient information received from the client PC 3A, 4A, or 5A, and the facsimile data is sent to the designated recipient.

The case where the TTI information data received from the client PC is given priority will now be described. If the fax server device 2A is directed to transmit facsimile data from the client PC 3A, 4A or 5A and it also receives TTI information data in addition to the facsimile data and information about the recipient, then this TTI information is appended to the facsimile data and the facsimile data is transmitted to the designated recipient. However, if TTI information data is not received, TTI information registered in the facsimile server device 2A is appended to the facsimile data, and the facsimile data is transmitted to the designated recipient. In this scenario, if TTI information data is not preregistered into the fax server device 2A and TTI information data is not received from the client, then the TTI information cannot be appended.

The fax server device 2A can be set to either of the above modes by a user through a predetermined operation of the operating unit 26.

Figure 3:
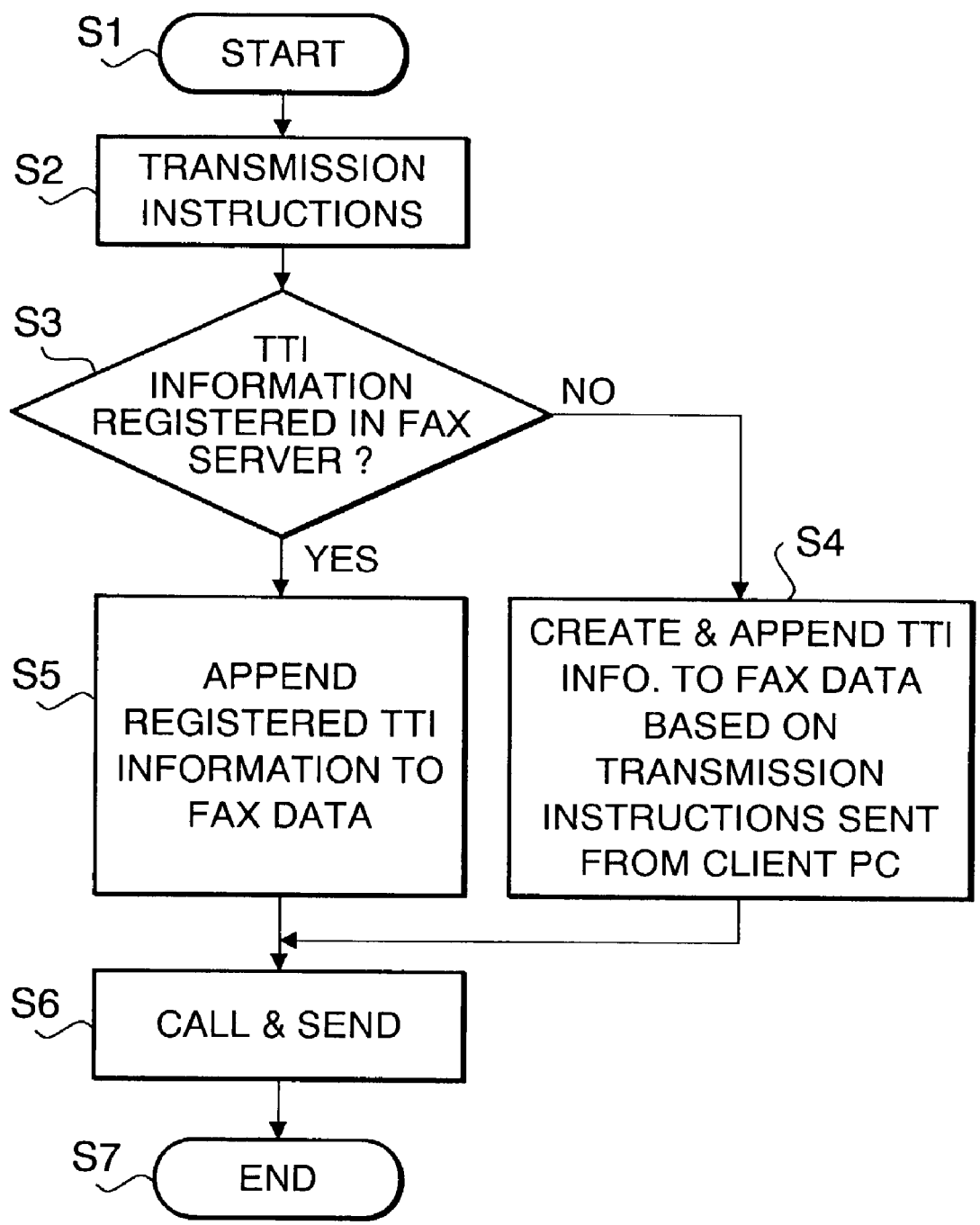
FIG. 3 illustrates a flow chart showing an example of the processing by which TTI is appended to facsimile data.

Referring to FIG. 3, illustrated is a flow chart showing an example of the processing to be executed by the facsimile server device 2A when it appends TTI information to facsimile data. The example is one in which the TTI information data registered in the facsimile server device 2A is given priority and appended to the facsimile data. The flow chart will now be described.

(1) The program begins at step S1. At step S2 the facsimile server device 2A receives instructions from a client PC 3A, 4A or 5A to transmit facsimile data to a remote communication device. Next, at step S3, it is determined whether or not TTI information data has been registered in the fax server device 2A. If no TTI information data is registered (NO at step S3), the program continues to step S4. At step S4, the TTI information is created and appended to the facsimile data based upon the information data about the recipient received from the client PC, and the program proceeds to step S6.

(2) If at step S3 the answer is YES, the program continues to step S5, and TTI information is appended to the facsimile data using the registered TTI information data registered in the facsimile server device 2A. Next, the facsimile data to which the TTI information has been appended is transmitted to the designated recipient at step S6, and the program ends at step S7.

Figure 4:
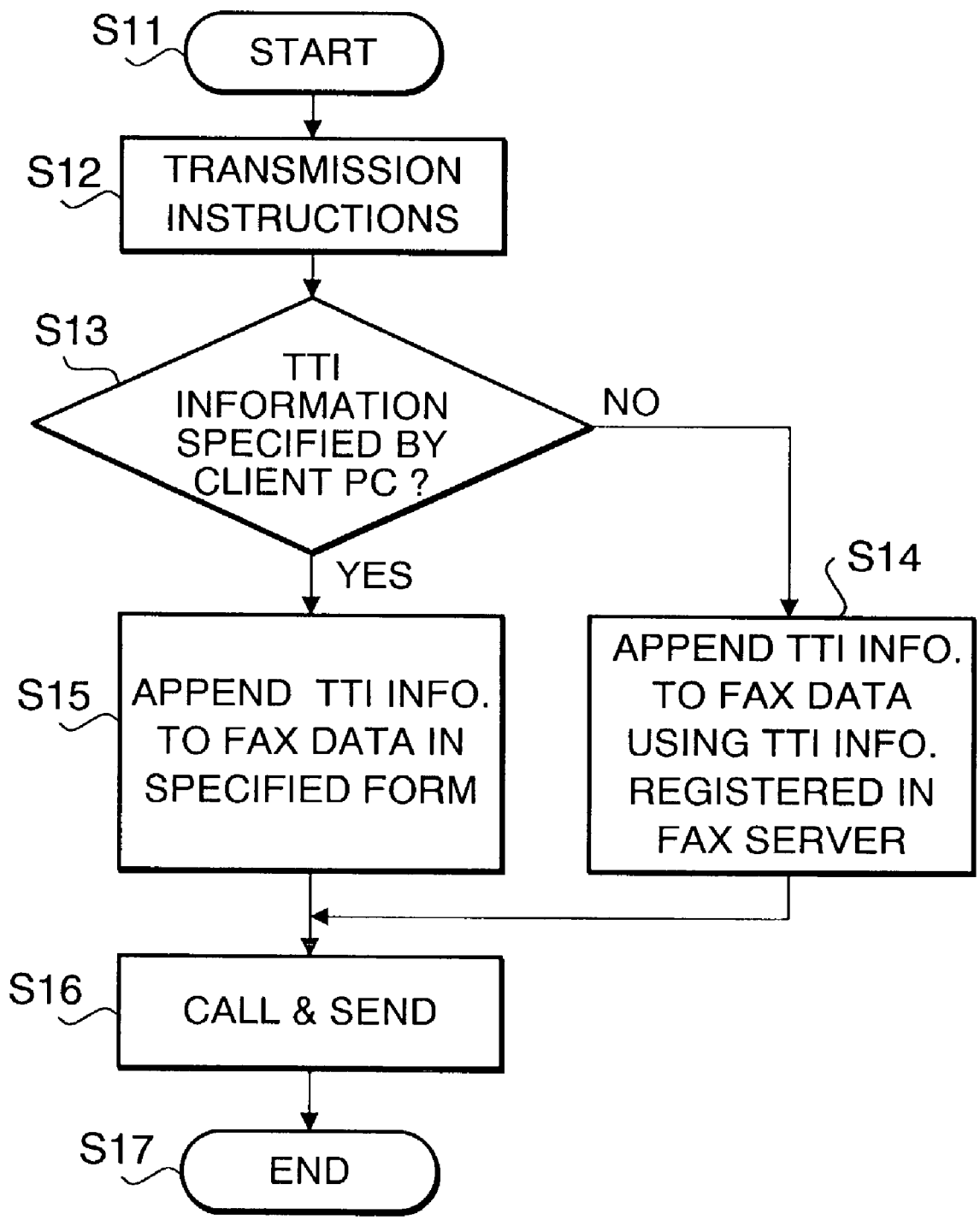
FIG. 4 illustrates a flow chart showing an alternate example of the processing by which TTI is appended to facsimile data.

FIG. 4 illustrates a flow chart showing another example of the processing for the facsimile server device 2A to append TTI information to facsimile data. In this example, if TTI information data is received from a client PC 3A, 4A, or 5A, it is given priority and appended to the facsimile data regardless of TTI information being registered in the facsimile server device 2A. The flow chart will now be described.

(1) The program begins at step S11. At step S12 the facsimile server device 2A receives instructions from a client PC 3A, 4A, or 5A to transmit facsimile data to a particular destination. Next, at step S13, it is determined whether or not TTI information data is specified in the transmission instructions received from the client PC. If no TTI is included in the instructions (NO at step S13), the program proceeds to step S14. At step S14, the TTI information data registered in the facsimile server device 2A is appended to the facsimile data, and the program advances to step S16.

(2) On the other hand, if the answer at step S13 is YES, the program continues to step S15, where the TTI information is appended to the facsimile data in a specified form based on the TTI information data provided from the client PC 3A, 4A, or 5A. Next, the facsimile data to which the TTI information has been appended is transmitted to the designated recipient at step 16, and the program ends at step S17.

The present invention is not limited to the described and illustrated embodiment, but various modifications and changes may be made without departing from the spirit and scope of the invention defined in the appended claims. For example, if the TTI information is not received from the client PC and not registered in a memory, TTI information may be created from data sent from the client PC and attached to the facsimile data.

The facsimile server device illustrated and described above is disclosed in Japanese Patent Application No. 10-90543 filed Feb. 26, 1998 and the entire disclosure thereof is incorporated herein by reference. This application claims priority of the above-mentioned Japanese Patent Application.

What is claimed is:

1. A facsimile server device which is adapted to be connected to a plurality of data processing devices and transmit facsimile data based on transmission instructions from at least one of the plurality of data processing devices, comprising:

storage means for storing transmittal terminal identifier information registered in the facsimile server device and transmittal, terminal identifier information specified in transmission instructions from a first data processing device;

means for determining priority between and selecting either the transmittal terminal identifier information data registered in the facsimile server device and/or the transmittal terminal identifier information specified in the transmission instructions from the first data processing device; and means for appending an image comprising the selected transmittal terminal identifier information to facsimile data when transmitting the facsimile data.

2. The facsimile server device of claim 1, wherein the means for appending the image comprising the selected transmittal terminal identifier information to facsimile data appends registered transmittal terminal identifier information to the facsimile data, when the means for determining determines that the transmittal terminal identifier information that is registered in the facsimile server device has priority and the transmittal terminal identifier information is registered in the facsimile server device.

3. The facsimile server device of claim 1, wherein the means for appending the image comprising the selected transmittal terminal identifier information to facsimile data creates and appends the transmittal terminal identifier information to the facsimile data based on information about a designated recipient in the transmission instructions sent from at least one of the plurality of data processing devices when the means for determining determines that the transmittal terminal identifier information registered in the facsimile server device has priority and the transmittal terminal identifier information is not registered in the facsimile sewer device.

4. The facsimile server device of claim 1, wherein the means for appending the image comprising the selected transmittal terminal identifier information to facsimile data includes:

means for appending registered transmittal terminal identifier information to the facsimile data, when the means for determining determines that the transmittal terminal identifier information registered in the facsimile sewer device has priority and the transmittal terminal identifier information is registered in the facsimile server device; and means for creating the transmittal terminal identifier information and appending the transmittal terminal identifier information to the facsimile data based on the transmission instructions sent from at least one of the plurality of data processing devices, when the means for determining determines that the transmittal terminal identifier information in the storage means has priority, and the transmittal terminal identifier information is not registered in the facsimile server device.

5. The facsimile server device of claim 4, further comprising:

means for calling a designated recipient.

6. The facsimile server device of claim 5, further comprising:

means for sending facsimile data to the designated recipient.

7. The facsimile server device of claim 1, wherein the means for appending the image comprising the selected transmittal terminal identifier information to facsimile data appends the transmittal terminal identifier information to the facsimile data in a specified form based on transmittal terminal identifier information provided by at least one of the plurality of data processing devices, when the means for determining determines that the transmittal terminal identifier information that is specified in the transmission instructions from at least one of the plurality of data processing devices will be given priority, and the transmittal terminal identifier information is specified in the transmission instructions provided by at least one of the plurality of data processing devices.

8. The facsimile server device of claim 1, wherein the means for appending transmittal terminal identifier information to facsimile data appends the transmittal terminal identifier information to the facsimile data using transmittal terminal identifier information registered in the facsimile server device.

9. The facsimile server device of claim 1, wherein the means for appending transmittal terminal identifier information to facsimile data includes:
    means for appending the transmittal terminal identifier information to the facsimile data in a specified form based on transmittal terminal identifier information provided by at least one of the plurality of data processing devices; and
    means for appending the transmittal terminal identifier information to the facsimile data using transmittal terminal identifier information registered in the facsimile server device.

10. The facsimile server device of claim 9, further comprising:
    means for calling a designated recipient.

11. The facsimile server device of claim 10, further comprising:
    means for sending facsimile data to the designated recipient.

12. A facsimile server device which is adapted to be connected to a plurality of data processing devices and transmit facsimile data based on transmission instructions from at least one of the plurality of data processing devices, comprising;
    register means for registering transmittal terminal identifier information;
    storage means for storing transmittal terminal identifier information specified in transmission instructions from a first of the plurality of data processing devices;
    means for determining priority between and selecting either transmittal terminal identifier information registered in the register means and/or the transmittal terminal identifier information stored in the storage means for the first data processing device; and
    means for appending an image comprising the selected transmittal terminal identifier information to facsimile data when transmitting facsimile data.

* * * * *